United States Patent Office

2,704,965
Patented Mar. 29, 1955

2,704,965

METHOD OF CLADDING BINDER-CONTAINING BOARD COMPOSITIONS WITH SHEET MATERIAL

Hermann G. Seybold, Westport, Conn.

No Drawing. Application April 19, 1950, Serial No. 156,953

3 Claims. (Cl. 92—39)

The present invention relates to methods of bonding any desired sheet material to surfaces of board compositions containing binder material, or sheathing and cladding such boards therewith and, more particularly, to such surfacing of board compositions commonly cast or felted from slurries containing a fibrous material ingredient and a binder material ingredient.

A general object of the present invention is to produce in an economical and easily practiced way readily adapted to commercial production such sheathed board compositions characterized by effective cladding thereof during compacting and curing of the latter, thereby eliminating necessity for practice of laminating procedures subsequent to the finish of the board compositions constituting the cores of the final stratified boards.

A more specific object of the present invention is the provision of a simple but unique short-cut for cladding such board compositions with sheet material by physically associating with one or both sides of each board body or core layer the sheathing or cladding sheet material during the molding or casting of the former, or at least prior to the curing of the former, and obtaining effective and substantially permanent adherence or bonding of the sheathing to the core during the curing by means of the binder material in the latter.

A further object of the invention is to provide such a procedure whereby relatively smooth-surfaced and substantially impervious sheets of sheet sheathing may be bonded or adhered to core layers of board compositions comprising felted fibrous material and binder material by means of the latter during the curing of the core layers.

Other objects of the invention will in part be obvious and will in part appear hereinafter.

The invention accordingly comprises the several steps and the relation of one or more of such steps with respect to each of the others thereof, which will be exemplified in the method hereinafter disclosed, and the scope of the invention will be indicated in the claims.

Prior to the present invention it has been proposed to apply to one or more surfaces of board composition sheathing or cladding sheet material; such as laminae of metal; wood; plywood; and plastic sheets of various types; by a laminating procedure involving cementing such sheet material to faces of the composition boards after the latter have been finished. Thus, production of such stratified boards involved two separate and distinct procedures, namely, (1) the formation of the board composition cores through to completion of the curing thereof, and, then, (2) the cladding of one or more surfaces thereof with sheathing by a laminating process. In accordance with the present invention, the production of such stratified board is appreciably simplified in a manner assuring economy in both time and manipulative steps, as well as material and costs by placing the sheathing in contact with the composition board core or base layer while it is still "wet" and securing substantially permanent adherence by means of the binder material in the core or base layer composition during the curing of the latter.

For example, it may be desired to sheath or clad one or more surfaces of the board compositions described and claimed in my co-pending applications Serial No. 156,951, filed April 19, 1950, for "Wallboard Composition and Method of Making Same" and Serial No. 156,-952, filed April 19, 1950, for "Wallboard Composition and Method of Making Same," with metal sheets such as sheets of stainless steel, copper, aluminum, or with sheets of wood, plywood or plastic. Such compositions comprise a particulate body ingredient and binder material ingredient, with the particulate body ingredient preferably including fibrous material. The particles of the body material are substantially uniformly admixed with particles of binder material in a water slurry or the binder material may constitute a part of the liquid portion of the slurry by addition in the form of a miscible solution. Board is formed from such compositions by casting the composition slurry into felted layers, such as by means of a Fourdrinier machine or by pouring it into a board-forming mold or form having a screen bottom, and then dewatering such as by use of pressure to form wet, uncured board. Thereafter the board is finished with the use of heat and/or pressure to effect the curing. In accordance with the present invention, the bonding of the sheathing or cladding sheet material is effected by applying the the latter to one or more faces of the wet, uncured board after dewatering the base layer of slurry solids or at the time such layer is cast. Thereafter, as the core or base layer is cured, the binder material therein securely bonds the sheathing thereto.

I prefer a core composition containing fibrous material, a mineral constituent comprising at least 50% expanded perlite and a binder. The binder may comprise water non-soluble powdered thermosetting synthetic resin intimately mixed with the mineral constituent before addition to a slurry of fibrous material in water or added to a water slurry of the mineral and fibrous constituents. Water resistance of the core composition may be enhanced by addition of minor quantities of soap and subsequently neutralizing the resulting slurry, while under agitation, with water-soluble acidic material. The binder material may also comprise water soluble silicate with subsequent neutralization of the slurry with acidic material to precipitate the silicate probably in the form of a silicic acid.

By way of example of one embodiment, core composition may be made and layers cast therefrom in the following manner. About 50 to 70 parts by weight of expanded perlite may be intimately mixed, for example, by grinding with about 10 to 16 parts by weight of water non-soluble, thermosetting synthetic resin, such, for example, as powdered phenolic, urea and melamine thermosetting resins, to form agglomerate bodies, comprising particles of expanded perlite having adhered thereto or covered by particles of the resin. The mass of agglomerate bodies is slowly added to an agitated slurry or suspension of about 10 to 30 parts by weight of cellulose fiber, such as wood fiber, kraft or newsprint fiber, in a suitable quantity of water. The weight ratio of water to the fiber may, for instance, be about 20:1. After thorough agitation, the composition slurry, which may, for enhancement of water-resistance, have added thereto a small amount of soap and then a neutralizing quantity of alum, and may be cast into board in a mold having a screen bottom to form the core or base layer.

If a sheathing sheet is to be bonded to the underface thereof, such sheet may be placed in the bottom of the form prior to the casting of the felted base layer therein with provision of slight clearance between the edges of the sheet and the sides of the form, and if such sheet is to be bonded to the top face of the felted layer, it may be laid over the latter after the casting of the latter in the form. Pressure of the order of about 100 to 400 pounds per square inch is then applied by means of a suitable press to the felted layer in the form to compact and dewater it to dampness, thereby producing wet board. This is hereinafter referred to as the cold press operation. If desired, however, the application of the sheathing sheets may be delayed until after the dewatering procedure, but in any event they are to be brought to physical contact with one or more of the faces of the board composition core or base layers prior to curing.

When employing soluble silicate instead of thermosetting water non-soluble resin as a binder constituent, a slurry is formed containing fibrous material, mineral ingredient and water soluble silicate, as for example a 40° Baumé solution of sodium silicate in water. For example, 30 to 200 or more parts by weight of sodium silicate (calculated as $Na_2O + 3.9SiO_2$) may be so employed. After further agitation of the slurry to secure uniform distribution of the silicate, there is added an amount of water soluble acidic material sufficient to neutralize the slurry as indicated by pH paper or other indicator means, the reaction between the silicate and the acidic material forming precipitates on the slurry solids to serve as binder material. The neutralized slurry may be cast and bonded to sheathing sheets in the same manner as described for a slurry containing thermosetting resin binder constituent.

In either case curing may then be accomplished by a hot press operation, such as by placing the board composition core or base layer with its sheet material sheathing in a hot press where the stratified structure is subjected to a pressure of about 100 to 400 pounds per square inch at a temperature of about 200° to 400° F. for a period of about 10 to 35 minutes. Generally the thicker the base layer and sheet material, the longer the necessary curing time. The hot press procedure completes polymerization of the resin or converts it into a thermoset stage, or, in the case of silicate binder, converts it into dehydrated silicic acid, to serve as an effective binder for the other solids in the composition and to bond thereto the sheathing sheets. As a result, the finished stratified board consists of a core layer of board composition which is firmly clad with the desired sheet material by a tenacious bond.

Curing may also be accomplished by drying at 100° to 200° F. for about 4 to 18 hours without application of pressure during the curing. In the case of silicate binder satisfactory curing and bonding is obtained when sheathed base layer is cured by air drying at temperatures as low as 60° F. but in this case time of curing must be extended, sometimes to 20 hours or more.

In the bonding of sheet material to board composition which includes as binder material thermosetting synthetic resins, a secure bond to the sheet material may be assured by wetting the bond face of the sheet material with a solvent for the resinous binder material. For example, the bond face of the sheet material may be wetted with methyl ethyl ketone, acetone, toluene, xylol or other solvents. Further, if the sheathing sheet material be a plastic formed from thermosetting synthetic resin, such as a phenolic-formaldehyde, such plastic sheet material may be juxtaposed to a surface of the wet, uncured composition layer while the plastic sheet material is also in an uncured condition. Thus, during the subsequent curing of the core or base layer to set up the resin therein, the uncured plastic sheathing simultaneously will be cured and bonded to the former.

Curing at relatively low temperatures without simultaneous application of pressure is particularly useful when the desired sheathing sheets comprise thermoplastic materials which would flow at temperatures and pressures employed in a hot press.

In the bonding of certain sheathing sheets to particular core compositions, it may be desirable or necessary, in order to avoid subsequent warping due to unequal contraction or differences in co-efficients of expansion of the different materials, to clad both faces of the core or base layer with sheet material having similar or like co-efficients of expansion. The thicker the base layer, the less tendency it has to warp in the absence of a compensating sheet of sheathing on the opposite face of the base layer.

It will thus be seen that within the scope of the present invention the bonding of sheathing sheet material to faces of board composition cores or base layers comprising particulate solids mixed with binder material is effected by the binder material in the core composition during the curing or final drying of the latter. It should thus be apparent that the objects set forth above, among those indicated in the preceding description, are efficiently attained and, since certain changes may be made in carrying out the above method without departing from the scope of the invention, it is intended that all matter contained in the above description shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

Having described my invention, what I claim as new and desire to secure by Letters Patent is:

1. A method of making a clad wallboard comprising forming an aqueous slurry with the inclusion, as the major constituents, in addition to water, of dispersible fibers of fibrous material, particulate mineral filler of which expanded perlite particles constitute at least about half and unset settable binder material weighting the expanded perlite particles; forming from said slurry a cast wet board in uncured state; intimately contacting a surface of the wet uncured board with a substantially smooth surfaced sheet material relatively free of pores and interstices into which the composition of the wet uncured board may key by one of the procedures of casting the board against the sheet material and placing the sheet material against the wet uncured board; and then curing the wet uncured board to set said settable binder material with maintenance of intimate contact between said board and sheet material whereby the set binder material effects a strong tenacious and secure bond between the cured board and sheet material thereby cladding the former with the latter.

2. A method of making a clad wallboard comprising forming an aqueous slurry with the inclusion, as the major constituents, in addition to water, of dispersible fibers of fibrous material, particulate mineral filler of which expanded perlite particles constitute at least about half and unset settable binder material weighting the expanded perlite particles, said unset binder material being water-insoluble reaction precipitates resulting from inclusion in the slurry of water soluble silicate and adjustment of the pH of said slurry to substantial neutrality by water-soluble acidic material; forming from said slurry a cast wet board in uncured state; intimately contacting a surface of the wet uncured board with a substantially smooth surfaced sheet material relatively free of pores and interstices into which the composition of the wet uncured board may key by one of the procedures of casting the board against the sheet material and placing the sheet material against the wet uncured board; and then curing the wet uncured board to set said settable binder material with maintenance of intimate contact between said board and sheet material whereby the set binder material effects a strong tenacious and secure bond between the cured board and sheet material thereby cladding the former with the latter.

3. A method of making a clad wallboard comprising forming an aqueous slurry with the inclusion, as the major constituents, in addition to water, of dispersible fibers of fibrous material, particulate mineral filler of which expanded perlite particles constitute at least about half and unset settable binder material weighting the expanded perlite particles, said unset binder material being particles of unset water non-soluble thermosetting synthetic resin adhered in dry state to the expanded perlite particles prior to inclusion of the latter into said slurry; forming from said slurry a cast wet board in uncured state; intimately contacting a surface of wet uncured board with a substantially smooth surfaced sheet material relatively free of pores and interstices into which the composition of the wet uncured board may key by one of the procedures of casting the board against the sheet material and placing the sheet material against the wet uncured board; and then curing the wet uncured board to set said settable binder material with maintenance of intimate contact between said board and sheet material whereby the set binder material effects a strong tenacious and secure bond between the cured board and sheet material thereby cladding the former with the latter.

References Cited in the file of this patent

UNITED STATES PATENTS

| Number | Name | Date |
|---|---|---|
| 242,253 | Benton | May 31, 1881 |
| 743,375 | Caldwell | Nov. 3, 1903 |
| 1,048,616 | Wheeler | Dec. 31, 1912 |
| 1,160,362 | Baekeland | Nov. 16, 1915 |
| 1,430,541 | Frederick | Oct. 3, 1922 |
| 1,476,570 | Adams | Dec. 4, 1923 |
| 1,692,783 | McManus | Nov. 20, 1928 |
| 1,731,754 | Richards | Oct. 15, 1929 |
| 1,754,551 | Keeth | Jan. 14, 1930 |
| 1,763,653 | Harvey et al. | June 17, 1930 |
| 1,791,537 | Shopneck | Feb. 10, 1931 |

(Other references on following page)

UNITED STATES PATENTS

| | | | |
|---|---|---|---|
| 1,887,726 | Weber | Nov. 15, | 1932 |
| 2,020,646 | Hornstein | Nov. 12, | 1935 |
| 2,108,116 | Furminger | Feb. 15, | 1938 |
| 2,197,405 | Edwards | Apr. 16, | 1940 |
| 2,217,119 | Kerr | Oct. 8, | 1940 |
| 2,330,814 | Drew | Oct. 5, | 1943 |
| 2,338,602 | Schur | Jan. 4, | 1944 |
| 2,359,097 | Elsey | Sept. 26, | 1944 |
| 2,407,247 | Briggs | Sept. 10, | 1946 |
| 2,565,251 | Halmstrom | Aug. 21, | 1951 |
| 2,626,864 | Miscall et al. | Jan. 27, | 1953 |

OTHER REFERENCES

Modern Plastics, September 1947, pages 89–91.